June 19, 1956  F. K. LOOMIS  2,751,193
PORTABLE CANTILEVER TOW SPOOL
Filed Sept. 3, 1953  2 Sheets-Sheet 1
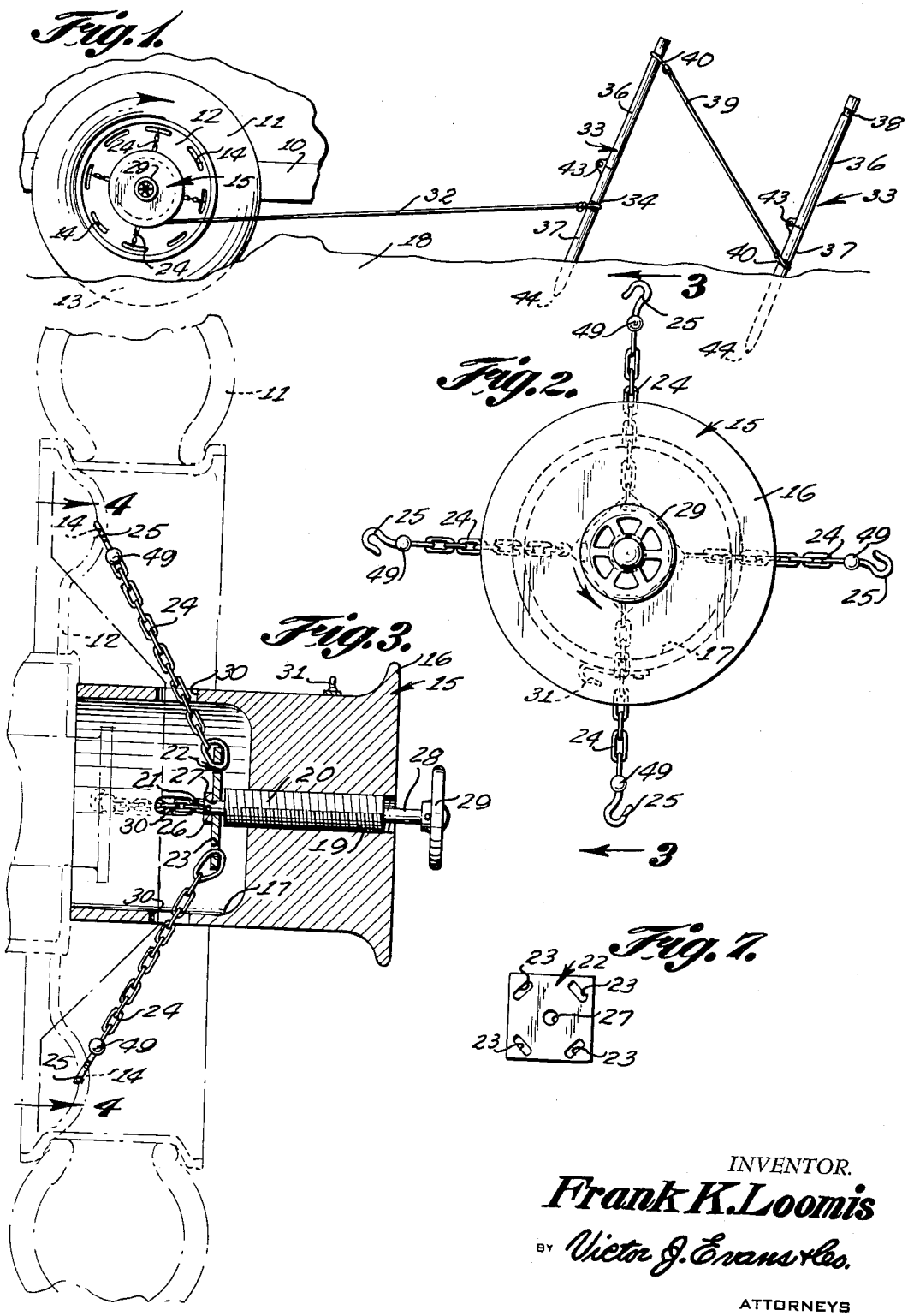
INVENTOR.
*Frank K. Loomis*
BY *Victor J. Evans & Co.*
ATTORNEYS

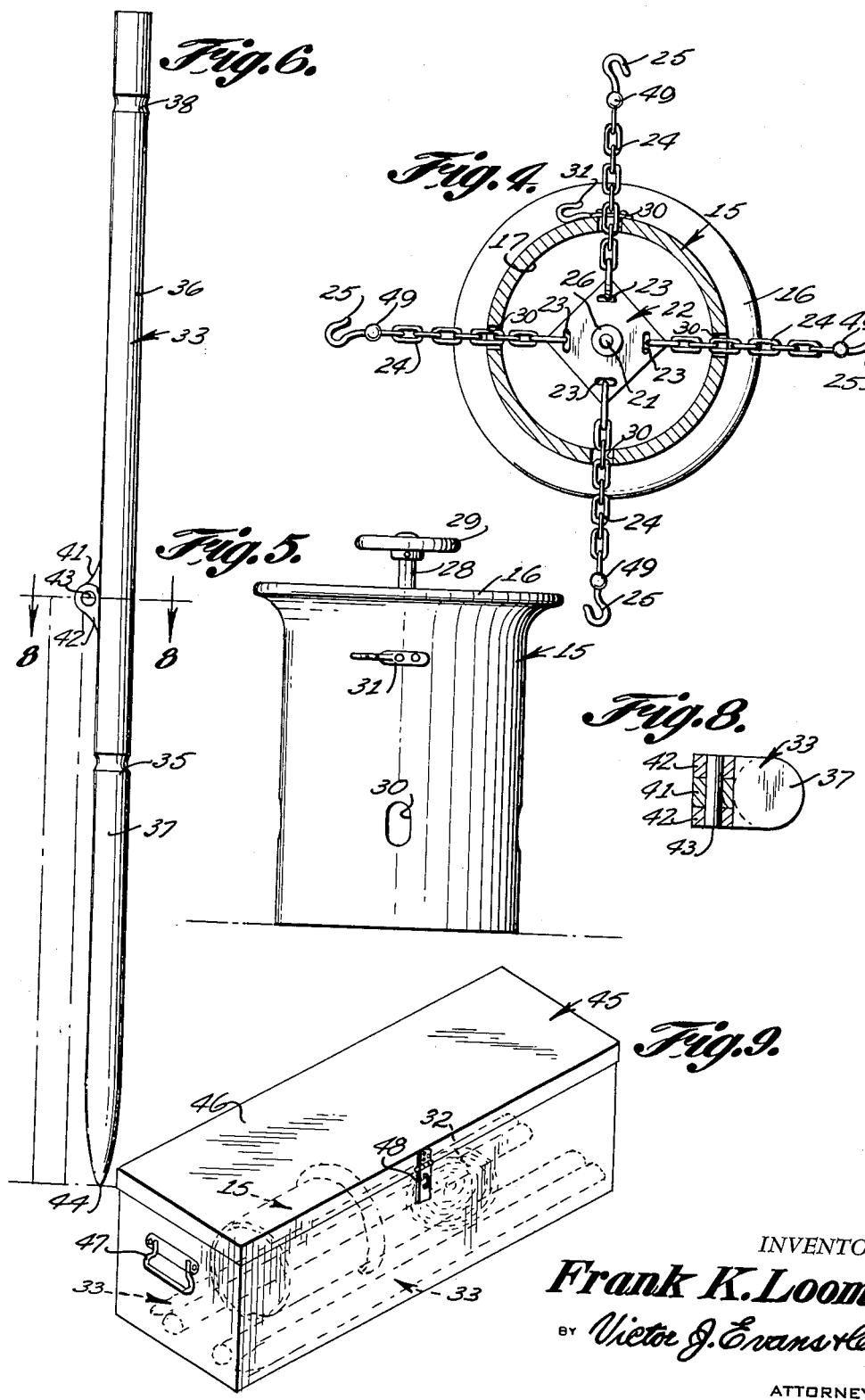

United States Patent Office 2,751,193
Patented June 19, 1956

2,751,193

PORTABLE CANTILEVER TOW SPOOL

Frank K. Loomis, Wallkill, N. Y.

Application September 3, 1953, Serial No. 378,309

1 Claim. (Cl. 254—166)

This invention relates to a vehicle, and more particularly to a portable cantilever towing spool for a vehicle.

The object of the invention is to provide a portable cantilever towing spool which will permit a truck, automobile or other vehicle to pull itself out of mud, snow, or the like when the vehicle is stuck.

Another object of the invention is to provide a spool which can be readily attached to a vehicle wheel when the vehicle is stuck in the mud or other locality, the assembly of the present invention being readily folded or disassembled so that it can be conveniently carried in a kit when it is not being used, and wherein when the present invention is attached to the vehicle wheel the vehicle will be able to pull itself out of the mud, snow or other material in which it may be stuck under the vehicle's own power.

A further object of the invention is to provide a portable cantilever tow spool assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the present invention being used for pulling a vehicle out of mud or the like.

Figure 2 is a side elevational view of the spool per se.

Figure 3 is a sectional view taken on the line 3—3 of Figure 2.

Figure 4 is a sectional view taken on the line 4—4 of Figure 3.

Figure 5 is a plan view of the spool.

Figure 6 is an elevational view of one of the posts.

Figure 7 is an elevational view of the plate.

Figure 8 is a sectional view taken on the line 8—8 of Figure 6.

Figure 9 is a perspective view showing the box or case for carrying the assembly when the assembly is not being used.

Referring in detail to the drawings, the numeral 10 designates a portion of a vehicle chassis which may be an automobile, truck, or other vehicle. One of the wheels of the vehicle is indicated by the numeral 11, and the wheel 11 includes a rim 12 which is provided with a plurality of openings or cut-outs 14, Figure 1.

The present invention is directed to an assembly for permitting the vehicle to pull itself out of a mud hole 13 or the like, Figure 1, and the numeral 18 designates the ground line. The present invention includes a spool 15 which may be made of any suitable material such as a suitable metal, and the spool 15 is shaped to provide an annular flange 16 which is arranged on the outer end thereof. Arranged interiorly of the spool 15 is a hollowed out chamber or compartment 17 for a purpose to be later described, Figure 3.

Extending through the spool 15 and communicating with the compartment 17 is a threaded bore 19, Figure 3.

An exteriorly threaded bolt or bar 20 is arranged in threaded engagement with the bore 19, and a shank 21 extends inwardly from the inner end of the bolt 20 and is secured thereto or formed integral therewith. A plate 22 is mounted on the shank 21, and the plate 22 is held in place by a locking member 26. The plate 22 is shown in detail in Figure 7, and the plate 22 is provided with a central opening 27 for the projection therethrough of the shank 21, and the plate 22 is also provided with a plurality of slots or openings 23 for receiving a portion of a chain 24. It will be seen that a plurality of the chains 24 are provided and each of the chains 24 has a hook 25 on an end thereof for engaging the openings 14 in the rim 12.

A means is provided for rotating the bolt 20, and this means comprises a stem 28 which extends outwardly from the bolt 20 and is secured thereto or formed integral therewith. A wheel or handle 29 is secured to the outer end of the stem 28, so that by rotating the handle 29 the spool can be secured to the vehicle wheel.

The spool 15 is provided with a plurality of openings 30 for the projection therethrough of the chains 24, Figures 3 and 5. A hook member 31 is secured to the outer surface of the spool 15, and a cable 32 has one end adapted to be arranged in engagement with the hook member 31.

The assembly of the present invention further includes a plurality of posts 33 which are adapted to be extended or driven into the ground 18. These anchoring posts 33 have the same construction and each includes an upper section 36 and a lower section 37 which are hingedly connected together so that they can be folded to occupy a minimum amount of space when not being used. A loop 34 is arranged on an end of the cable 32, and the loop 34 is adapted to engage an annular groove 35 in the lower section 37, Figures 1 and 6. The upper sections 36 of the posts are each provided with an annular groove 38.

A means is provided for interconnecting the posts 33 together. This means comprises a cable 39 which has loops 40 on each end thereof. The loops 40 are adapted to be arranged in engagement with the grooves 38 and 35 as shown in Figure 1.

As previously stated the sections 36 and 37 are hingedly connected together. Thus, as shown in Figures 6 and 8 a hinge pin 43 extends through a pair of ears 42 which are secured to the lower section 37, and the pin 43 also extends through an ear 41 which is arranged between the pair of ears 42, the ear 41 being secured to the upper section 36. The lower end of each of the posts 33 is pointed as at 44 so as to facilitate the driving of the post into the ground.

Referring to Figure 9 there is shown the kit or box for holding the present invention when the assembly is not being used. Thus, the box is indicated by the numeral 45, and a cover 46 may be provided for the box 45. Handles 47 may be provided for carrying the box and a suitable latch mechanism 48 may be provided for maintaining the cover in closed position.

From the foregoing it is apparent that an assembly has been provided which will permit a vehicle to pull itself out of the mud, snow or the like when the vehicle gets stuck. Thus, as shown in Figure 1 to use the device it is only necessary to arrange the spool 15 contiguous to the wheel 11 which is stuck. Then, the hooks 25 are arranged in engagement with the openings 14 in the wheel rim 12. Then by rotating the handle 29 the chains 24 will be tightened to thereby secure the spool 15 to the vehicle wheel. Next, the posts 33 are driven into the ground 18 and these posts 33 may be interconnected by the cable 39. Then, the cable 32 is connected to one of the posts 33 and the other end of the cable 32 is arranged in engagement with the hook member 31 on the spool 15. Then, upon actuation of the vehicle the wheel 11 will be rotated to thereby cause the spool 15 to wind up on the cable 32 so that the wheel will pull itself out of the hole 13.

When the bolt 20 is tightened, the spool 15 will be maintained rigidly on the wheel 11. By means of the portable cantilever tow spool assembly of the present invention any truck or car of any weight will be able to pull itself out of the mud in which it is stuck under its own power. The spool 15 is attached to the wheel 11 by means of the chains 24 and hooks 25 and the spool is made taut by tightening the heavy threaded bolt 20 in the center of the spool 15. This will pull the spool onto the wheel and will be secure enough to take the power. To the spool 15 a long cable 32 is attached by means of the hook member 31 on the spool. The other end of the cable 32 is attached to a bar or post 33 and one or more bars or posts 33 may be arranged rearwardly of the post 33 closet to the vehicle. With the cable 32 attached to the spool 15 and to the post 33, the truck or other vehicle is started in crawler or reverse gear as shown by the direction of the arrow in Figure 1, and the vehicle moves out of the hole, mud, or ditches 13 with no difficulty whatsoever and climbs the cable 32. The posts 33 are hinged in the center so that the posts can be folded and placed in a box such as the box 45 with the spool until it is needed. The bolt 20 may be threaded in a counterclockwise manner. Swivel links 49 may connect the hooks 25 to the chains 24.

I claim:

In combination, a spool arranged contiguous to a vehicle wheel and provided with a hollow compartment extending from its inner end, there being a threaded bore in the central portion of said spool communicating with said compartment, said bore being of less diameter than said compartment, an exteriorly threaded bolt arranged in engagement with said bore, a shank of reduced diameter extending into said compartment from the inner end of said bolt, a rectangular plate mounted on said shank and provided with a central opening for the projection therethrough of said shank, connecting means extending between said plate and the wheel of the vehicle, a hook member arranged on the outer surface of said spool, a cable trained over said spool and having one end connected to said hook member, and a plurality of inclined posts anchored in the ground and connected to each other, said cable being connected to one of said posts, said posts each including an upper section and a lower section, each of said sections being provided with an annular groove, a first pair of ears secured to said lower section, a second ear secured to said upper section and interposed between said first pair of ears, there being registering openings in said ears, a pin extending through said registering openings, the bottom end of each of said lower sections being pointed, and manually operable means for rotating said bolt, said manually operable means comprising a stem of reduced diameter extending from the outer end of said bolt, a handle secured to said stem, said connecting means comprising a plurality of chains each having a hook on an end thereof for engaging the vehicle wheel, swivel links connected to said hooks, there being a plurality of spaced openings in said plate engaged by said chains, there being a plurality of openings in said spool communicating with said compartment for the projection therethrough of said chains.

References Cited in the file of this patent

UNITED STATES PATENTS

| | | |
|---|---|---|
| 1,322,630 | Schroeder et al. | Nov. 25, 1919 |
| 1,380,205 | Halvorson | May 31, 1921 |
| 1,892,785 | Keiser | Jan. 3, 1933 |

FOREIGN PATENTS

| | | |
|---|---|---|
| 2,393 | Australia | of 1926 |